June 15, 1965  E. GUBLER  3,189,324
KNEADING AND MIXING APPARATUS
Filed Dec. 6, 1961

United States Patent Office 3,189,324
Patented June 15, 1965

3,189,324
KNEADING AND MIXING APPARATUS
Ernst Gubler, Nadelberg 7, Basel, Switzerland
Filed Dec. 6, 1961, Ser. No. 157,426
1 Claim. (Cl. 259—9)

The present invention relates to a kneading and mixing apparatus which comprises a housing provided with tooth-like projections and a rotatable worm therein which in special cases also oscillates, the turns of the worm being divided by radial slots into helical vanes. The disadvantage of such kneading and mixing apparatus consists in that in the case of delicate materials, such as for example dough or chocolate, the mass in fact is excellently mixed, but is shredded during the mixing. The mass worked in this manner does not possess the necessary elasticity or is not sufficiently plastic, so that it must be left to stand for a relatively long time before further working.

The aim of the invention is to provide a kneading and mixing apparatus wherein the initially mentioned disadvantage does not occur. The kneading and mixing apparatus according to the invention is characterised in that it posses a mixing part formed by the co-operation of kneading teeth and helical vanes and an adjoining plasticising part, which possesses no kneading teeth at all or kneading teeth which are considerably set back in relation to the teeth of the mixing part.

According to a preferred embodiment the kneading teeth are omitted in the plasticising part, the corresponding part of the worm shaft being thickened. In a special kneading form the worm kneading surfaces are formed in a wedge shape, in relation to the housing.

Another variant of the object of the invention relates to the use of a plasticising strip which is situated in advance of the corresponding helical vanes.

The invention will be further described hereinafter by reference to examples which are illustrated in the accompanying drawing, wherein.

Figure 1:
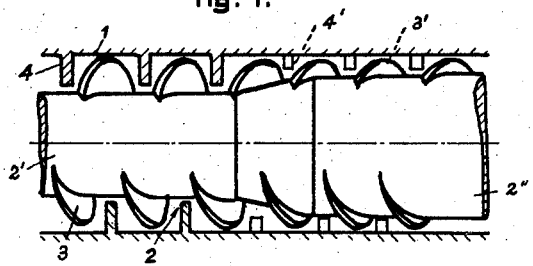
FIGURE 1 shows a first embodiment of the keading and mixing apparatus, in longitudinal sections.
Figure 2:
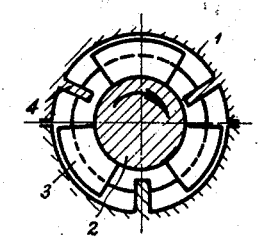
FIGURE 2 shows a corresponding cross-section in the embodiment of FIGURE 1.

In all of the figures of the drawing, the kneading and mixing apparatus comprises a housing which is designated by 1 in all examples. In this housing there is arranged a worm which possesses a worm shaft 2 with helical vanes 3 which co-operate with a number of kneading teeth 4. The kneading teeth are secured on the inner wall of the housing 1, in such fashion that they extend into the interspaces between the helical vanes.

As may further be seen from FIGURE 1, the worm shaft 2 is made in two parts and is composed of a thinner part 2′ and a thickened part 2″. The thicker part 2″ carries correspondingly reduced helical vanes 3′.

Figure 6:
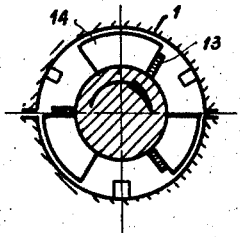

Only in the region of the shaft part 2′ and of the helical vanes 3 are kneading teeth 4 arranged, while in the region of the thickened shaft part 2″ there are provided either no teeth at all or teeth 4′ which are greatly set back. The part 2″ of the shaft together with the construction of the housing pertaining thereto acts as a plasticising part, which is shown in FIG. 6 as 3 strips and which adjoins the actual mixing part. This mixing part is formed by the shaft part 2′, the helical vanes 3 and the kneading teeth 4.

Figure 3:
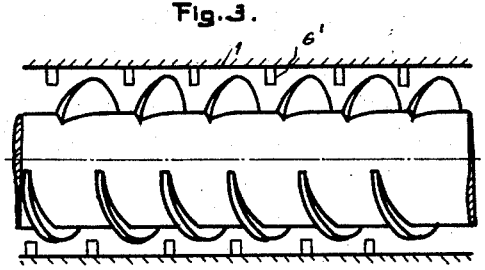
FIGURE 3 shows a first variant of the mixing and kneading apparatus in longitudinal section.
Figure 4:
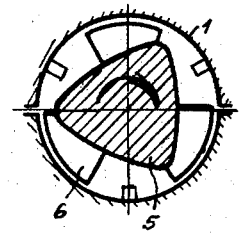
FIGURE 4 shows a cross-section of FIGURE 3.
Figure 5:
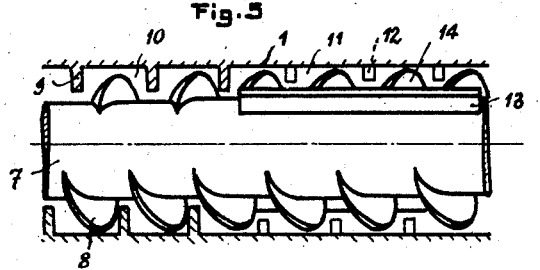
FIGURE 5 shows another variant in longitudinal section and FIGURE 6 shows a corresponding cross-section in the embodiment of FIGURE 5.

According to the variant as illustrated in FIGURE 3, the plasticising part of the mixing and kneading apparatus is formed by a shaft 5 which is provided with wedge-shaped kneading surfaces in cross-section and with helical vanes 6 with which there co-operate kneading teeth 6′ which are greatly set back. These kneading teeth are only illustrated in dot-and-dash lines in FIGURES 3 and 4, since they represent an alternative embodiment. The action of the kneading surfaces corresponds to the known rolling effect, wherein as a result of the frictional conditions prevailing in a wedge-shaped space between two moving surfaces the product is drawn into the wedge and forced through the narrowest gap. The last embodiment of the invention may be seen from FIGURES 5 and 6. In the worm housing 1 there is arranged a shaft 7 possessing the same diameter over its entire length. The shaft 7 is provided with helical vanes 8 which co-operate as usual with kneading teeth 9. The kneading teeth 9 are provided only in the mixing part 10 of the worm, while the plasticising part 11 possesses no teeth or teeth 12 which are greatly set back. The shaft 7 possesses plasticising strips 13 which extend through the plasticising part 11 and are secured before the worm turns 14. The action of the plasticising strip corresponds substantially to the work of the above described wedge-shaped kneading surfaces.

In all the described forms of embodiment of the mixing and kneading arrangement, the mass to be worked is handled in a careful manner and shredding thereof is avoided.

What I claim is:

A kneading and mixing apparatus comprising a housing; tooth-like projections integral with the interior of said housing which project from said interior at regularly spaced intervals and provide kneading teeth; a rotatable worm shaft fitting into said housing the front portion of said worm shaft serving to define a mixing zone and the rear portion of said worm shaft serving as a kneading element, said worm shaft being provided along its entire length with at least three longitudinally spaced and circumferentially placed slots; at least three helical vanes having wedge-shaped faces fitted at their bottoms into each of the corresponding slots; said teeth extending into the interspaces between said helical vanes; elongated strips longitudinally mounted along the rear portion of the worm shaft which build up the cross section of said rear portion, and said elongated strips being set back from the outer edge of the wedge face of each of the helical vanes at the rear portion of said shaft, the helical vanes and kneading teeth together with said longated strips defining a greatly reduced free space between the worm shaft and housing at the rear portion of said worm shaft into which the product is drawn from the front to the rear of the mixing apparatus.

References Cited by the Examiner
UNITED STATES PATENTS

| 2,731,247 | 1/56 | Hudry | 259—97 X |
| 2,765,491 | 10/56 | Magerkurth | 18—12 |
| 2,936,161 | 5/60 | Cummings et al. | 259—9 X |

FOREIGN PATENTS 835,621  5/60  Great Britain.

CHARLES A. WILLMUTH, *Primary Examiner.*
J. S. SHANK, WALTER A. SCHEEL, *Examiners.*